(12) United States Patent
Konno

(10) Patent No.: US 7,056,243 B2
(45) Date of Patent: Jun. 6, 2006

(54) PLASTIC MOVABLE GUIDE FOR TRANSMISSION DEVICE

(75) Inventor: Masahiko Konno, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 103 days.

(21) Appl. No.: 10/281,758

(22) Filed: Oct. 28, 2002

(65) Prior Publication Data

US 2003/0092521 A1 May 15, 2003

(30) Foreign Application Priority Data

Nov. 14, 2001 (JP) ............................. 2001-349133

(51) Int. Cl.
*F16H 7/08* (2006.01)
*F16H 7/18* (2006.01)

(52) U.S. Cl. ...................................... 474/111
(58) Field of Classification Search ........ 474/109–111, 474/140, 144, 101
See application file for complete search history.

(56) References Cited

U.S. PATENT DOCUMENTS

| | | | | |
|---|---|---|---|---|
| 4,826,468 A | * | 5/1989 | Friedrichs | 474/101 |
| 4,832,664 A | * | 5/1989 | Groger et al. | 474/111 |
| 5,184,982 A | * | 2/1993 | Shimaya et al. | 474/101 |
| 5,318,482 A | * | 6/1994 | Sato et al. | 474/111 |
| 6,062,998 A | * | 5/2000 | Kumakura et al. | 474/111 |
| 6,428,899 B1 | * | 8/2002 | Fujiwara et al. | 428/474.4 |
| 2002/0077204 A1 | | 6/2002 | Kumakura | |

FOREIGN PATENT DOCUMENTS

| | | |
|---|---|---|
| DE | 195 23 912 A1 | 3/1997 |
| EP | 1 241 380 A2 | 9/2002 |
| GB | 2347174 A * | 8/2000 |
| GB | 2 351 136 A | 12/2000 |
| GB | 2351136 A * | 12/2000 |
| JP | 10-311395 A | 11/1998 |
| JP | 2000-97300 A * | 4/2000 |
| JP | 2001-280435 A | 10/2001 |
| JP | 3253951 B1 | 11/2001 |

* cited by examiner

*Primary Examiner*—Marcus Charles
(74) *Attorney, Agent, or Firm*—Howson and Howson

(57) ABSTRACT

In a pivoted plastic movable guide for a chain or belt transmission, having a reinforcing plate disposed in a slot on a plate-receiving portion on a back side of the guide, a plunger-engaging part of the plate protrudes slightly from the opening of the slot for contact with the plunger of a tensioner. The plunger-receiving portion of the plate has a curved profile, preferably in the form of a convex or concave circular arc, which engages the plunger over a contact area which does not vary with a changing angle between the plunger and the guide. The edge of the reinforcing plate is also preferably in the form of a circular arc, or has beveled or rounded edges to avoid excessive wear due to load concentration.

9 Claims, 10 Drawing Sheets

PLASTIC MOVABLE GUIDE FOR TRANSMISSION DEVICE

CROSS REFERENCE TO RELATED APPLICATION

This application claims priority under 35 U.S.C. §119 on Japanese patent application 349133/2001, filed Nov. 14, 2001.

FIELD OF THE INVENTION

This invention relates to a plastic movable guide for a flexible power transmission medium, such as chain which transmits power between sprockets, or a belt which transmits power between pulleys. It relates particularly to improvements in a mechanism in which the guide is pivoted on a mounting shaft and held in sliding engagement with the power transmission medium by the plunger of a tensioner lever.

BACKGROUND OF THE INVENTION

An engine generally includes a transmission device, which transmits power from the crankshaft to one or more camshafts by means of a chain, a belt or the like, as shown in FIG. 15. Similar power transmission devices are also used in other machines, especially where a driven shaft is to be rotated by a driving shaft which is parallel to, but spaced some distance from, the driven shaft. In the transmission device of FIG. 15, a movable guide Ga, in sliding contact with a circulating power transmission medium, which in this case is an endless CH, cooperates with a tensioner T to maintain appropriate tension in the chain, and also prevents vibration in the plane of travel of the chain as well as transverse vibrations.

The movable guide Ga is attached to a frame E of the engine on a supporting shaft P, which may be a mounting bolt, a pin or the like. In FIG. 15, a driving sprocket S1, which may be a crankshaft sprocket, operates driven sprockets S2, which may be camshaft sprockets, through the chain CH. A fixed guide Gb is also provided for limiting and guiding the travel of the circulating chain CH.

FIG. 10 is a side elevational view a plastic movable guide 300, used as a tensioner lever in a chain transmission, which the present inventor previously described in Japanese Patent Application No. 2000-382798, and FIG. 11 is a bottom plan view of the plastic movable guide.

In this plastic movable guide 300, a guide body 301 includes a shoe 302, with the surface of which a traveling chain CH is sliding contact. The guide body also includes a plate-receiving portion 303 extending along the back of the shoe 302 along the longitudinal direction of the guide. The shoe and plate-receiving portion are integrally molded as a unit from a synthetic resin. A plate 308, composed of a rigid material, typically metal, reinforces the guide body 301, fits into a slot 307 in the plate receiving portion. This slot extends along the longitudinal direction of the guide and has its opening facing in a direction opposite to the direction in which the chain-engaging surface of the shoe faces. Amounting hole 305, for mounting the guide on the frame of an engine or other machine, is provided in the plate-receiving portion near one end of the guide. A through hole 308A is provided in the reinforcing plate 308 near one end thereof. These holes, 305 and 308A, are in register with each other when the reinforcing plate is inserted into the slot 307 in the plate-receiving portion, and both receive a supporting shaft P (FIG. 15).

Since the guide body 301 itself incorporates a shoe on which the chain slides, it is not necessary to provide a separate shoe member. Thus, the integrally molded construction reduces the number of parts required for the guide, and also reduces the number of required production steps. The reinforcing plate 308 increases the strength, toughness and bending rigidity of the guide in the pivoting direction.

In the plastic movable guide 300, the relationships between the respective sizes and shapes of the guide body 301 and the reinforcing plate 308 are not particularly considered, and the mounting hole 305 was designed so that its diameter was the same as that of the through hole 308A. However, variations in accuracy in production, and the differences between coefficients of thermal expansion of materials, either caused the reinforcing plate 308 to protrude slightly from the slot, or to retract into the slot by causing the reinforcing plate 308 to become slightly smaller than the guide body 301. Various phenomena occur as a result of these variations.

When the above-mentioned plastic movable guide was attached to the frame of an engine and used as a tensioner lever, a higher level of noise occurred compared the level of noise occurring where a movable guide composed entirely of plastic was used. Accordingly, an improvement in quietness is desired.

There was also a danger that the integrally molded, synthetic resin guide-body would become worn and deteriorate, finally reaching a stage at which it would fracture when struck by the plunger of the tensioner. In order to reduce the rate of wear and deterioration, it was believed necessary to incorporate fibers in the synthetic resin, or to subject the synthetic resin to a cross-linking process or the like, both of which measures resulted in increased production cost.

The inventor has studied and analyzed the causes of noise and deterioration in plastic movable guides, and has found that the above-described problems are not generated in the same manner in all plastic movable guides. When the reinforcing plate is retracted into the plate-receiving portion of the guide body at the location of the plunger-receiving portion, as shown in FIG. 12(a), the reinforcing plate 308 moves back and forth in the slot 307 of the guide body 301 every time the plunger 310 hits the guide body 301. As a result the end portion of the reinforcing plate is brought into contact with the front surface of the plunger as shown in FIG. 12(b) and the level of metallic noise that occurs is higher than in the usual case, where the reinforcing plate is in flush relationship with the opening of the slot. Further, the inventor also found that the other edge of the reinforcing plate 308 hit the bottom of the slot, i.e., the back surface of the shoe, as shown in FIG. 12(a), as the plate moved back and forth in the slot 307. The repeated engagement of the edge of the plate 308 with the back of the shoe resulted in cracks in the synthetic resin and caused deterioration of the shoe.

As shown in FIG. 10, the profile of the plunger-receiving portion 301B of the plastic movable guide 300 is a straight line. Thus, the contact angle between the front end of the plunger and the plunger-receiving portion changes in use as the plunger projects and the guide rotates about its pivot axis. As shown in FIGS. 13(a) and 13(b), the contact area between the front end of the plunger and the plunger-receiving portion decreases, and load is concentrated at one portion of the plunger-receiving portion. The inventor has found that the concentration of the load was a cause of accelerated wear in the plunger-receiving portion of the guide. Additionally it has become clear that, while using the plastic movable guide, vibration can cause the movable guide, or the plunger, to become inclined relative to the plane of rotation of the plunger about its pivot axis. When this inclination occurs, as shown in FIGS. 14(*a*) and 14(*b*), load is concentrated at a corner of the edge of the reinforcing plate, causing acceleration of wear of the reinforcing plate.

Accordingly, the objects of this invention are to solve the above-mentioned problems encountered in the use of prior plastic movable guides, and to provide a plastic movable guide having superior quietness of operation, reduced production cost, and comparatively little wear of the reinforcing plate over a long period of time.

SUMMARY OF THE INVENTION

A preferred plastic movable guide in accordance with the invention comprises a guide body including an elongated shoe having front and back sides facing in opposite directions, a surface on the front side of the shoe for sliding engagement with a traveling, flexible, power transmission medium, and a plate-receiving portion extending longitudinally along the back side of the shoe. The shoe and plate-receiving portion are integrally molded as a unit from a synthetic resin. The plate-receiving portion has a slot with an opening facing in a direction opposite to the direction in which said front side faces. An elongated reinforcing plate, provided for reinforcing the guide body, fits into the slot. The guide body has a mounting hole, adjacent to an end of the plate-receiving portion, for mounting the guide on a frame of a machine, and the reinforcing plate similarly has a through hole adjacent one of its ends. The mounting hole and the through hole are in register with each other so that a mounting shaft on which the guide is pivoted can extend through both holes. The guide body has a plunger-receiving portion at a location remote from the holes. The slot extends at least into the plunger-receiving portion. The reinforcing plate protrudes from the slot at the location of the plunger-receiving portion to expose at least a portion of an edge of the reinforcing plate, whereby a plunger of a tensioner may press directly against that portion of the edge of the reinforcing plate at that location. The protruding portion of the edge of the reinforcing plate has a curvature such that the area of contact between the reinforcing plate and an end surface of a plunger in the plunger is substantially constant irrespective of the contact angle between the reinforcing plate and the plunger. The curved portion of the edge of the reinforcing plate is preferably in the form of a convex or concave circular arc, depending on the shape of the end of the plunger with which it is in engagement. The transverse cross-sectional shape of the plunger-engaged edge of the reinforcing plate is preferably a substantially circular arc, a beveled rectangle, or a rectangle having rounded corners.

The particular plastic material forming the guide body is not especially limited. However, since a surface suitable for sliding surface with a chain, a belt or the like is required so that the shoe portion of the guide functions properly, the material is preferably a so-called engineering plastic, such as a polyamide type resin, having superior wear resistance and lubricating properties. It is possible to utilize a fiber-reinforced resin solely, or to use a fiber-reinforced resin concurrently with another resin. The material of the reinforcing plate is likewise not especially limited, but, since the reinforcing plate must have the bending rigidity and strength required for the plastic movable guide, iron based metals such as cast iron, stainless steel and the like, nonferrous metals such as aluminum, magnesium, titanium and the like, engineering plastics such as polyamide type resin and the like, and fiber reinforced plastics, are preferably used.

The following unique effects are obtained with the plastic movable guide according to the invention.

First, since the reinforcing plate protrudes slightly from the slot, the reinforcing plate can remain in contact with the plunger during forward and backward movement of the plunger. Repeated contact between the reinforcing plate and the front end of the plunger at a high relative speed, due to back and forth motion of the reinforcing plate in the guide body, does not occur, and the generation of metallic noise is suppressed.

Second, since hitting of the back surface of the shoe, due to back and forth motion of the reinforcing plate in the guide body, does not occur, cracks and wear in the shoe are significantly reduced.

Third, the profile of the reinforcing plate is formed so that the reinforcing plate and end of the plunger maintain a substantially constant contact area irrespective of the angle between the plunger and the guide. Even if the angle varies as a result of elongation of the chain or other power transmission medium, a fixed contact area is maintained between the reinforcing plate and the front end surface of the plunger. Accordingly, no concentration of contact pressure occurs, and deterioration of the reinforcing plate due to wear is suppressed.

The profile of the reinforcing plate at the location of the plunger-receiving portion can made be in the form of a convex or concave circular arc, without special machining processes, and with the profile in either of these forms, the contact area between the reinforcing plate and the end of the plunger can be maintained at a fixed value.

If the transverse cross-section of the plunger-contacting portion of the reinforcing plate is in the form of a substantially circular arc, or has beveled or rounded corners, even if vibration of the guide or the plunger of the tensioner causes the guide and plunger to become inclined relative to each other, concentration of load on a corner of the reinforcing plate is avoided, thereby reducing wear of the reinforcing plate and extending its useful life.

BRIEF DESCRIPTION OF THE DRAWINGS

FIG. 8(*b*) is a side elevational view showing the reinforcing plate of FIG. 8(*a*) in contact with the plunger at a different contact angle;

DETAILED DESCRIPTION OF THE PREFERRED EMBODIMENTS

Figure 1:
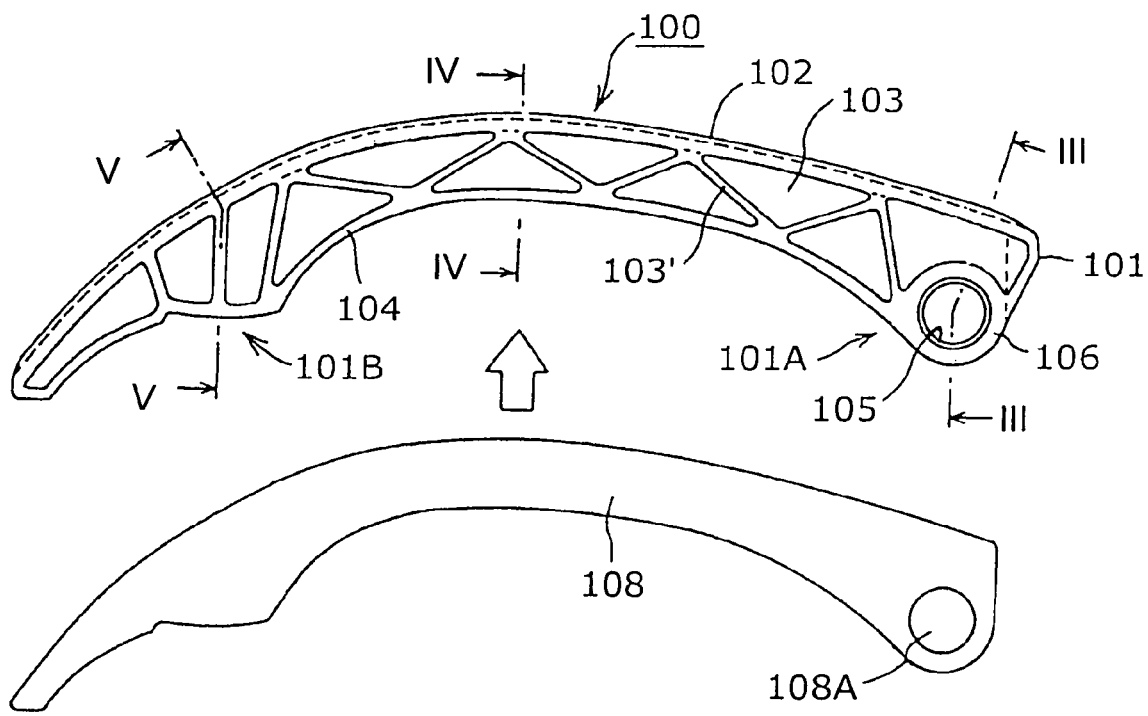
FIG. 1 is an exploded side elevational view of a movable guide in accordance with a first embodiment of the invention.
Figure 2:
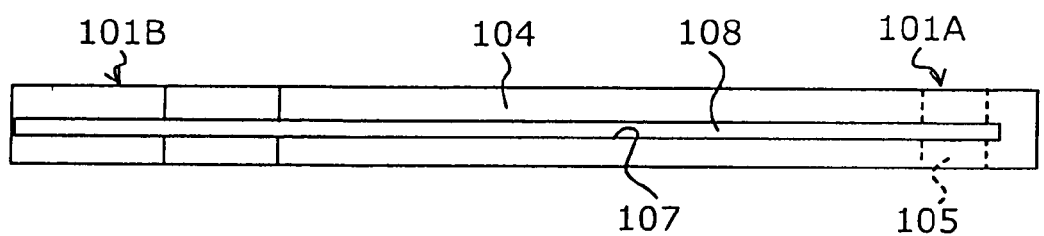
FIG. 2 is a bottom plan view of the guide of FIG. 1.

The movable guide 100, shown in FIG. 1 is formed by incorporating a reinforcing plate 108 into a guide body 101 in a direction of the arrow. This guide body 101 is a plastic body integrally molded as a unit from synthetic resin. The guide body comprises a shoe 102, having on one side a sliding surface on which a traveling chain slides, and, on its opposite side, a plate-receiving portion 103, which is elongated along the longitudinal direction of the guide. The plate-receiving portion extends from the shoe in a direction opposite to the direction in which the sliding surface faces. The guide body 100 includes a flange 104 formed at an edge of the plate-receiving portion 103, and a boss 106 having a mounting hole 105 for pivotally mounting the guide on the frame of an engine, or other machine having a drive using a chain, belt, or similar flexible power transmission medium. The plate-receiving portion 103 has a truss-shaped array of reinforcing ribs 103", and a slot 107 in the flange 104, the slot being open in a direction opposite to the direction in which the sliding surface of the shoe faces, as can be seen from FIGS. 3 to 5. To reinforce the guide body 101, a reinforcing plate 108, having a mounting hole for receiving a bolt or the like, is fitted into the slot 107.

Figure 5:
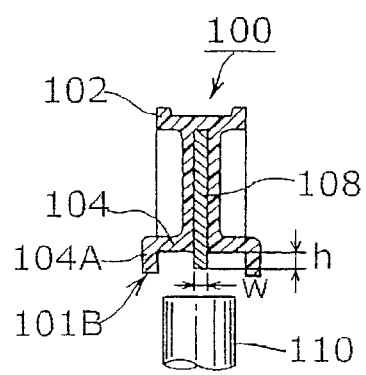
FIG. 5 is a cross-sectional view taken on surface V—V in FIG. 1, showing a plunger being brought into contact with a plunger-receiving portion on a pivoting front end of the guide.

As shown in FIG. 5, a plunger-receiving portion 101B is formed near the pivoting front end of the guide body 101. The reinforcing plate 108 protrudes slightly from the slot opening at this location, and plunger 110 of a tensioner presses against the protruding portion of the reinforcing plate. Because the reinforcing plate 108 protrudes slightly from the slot, when the plunger contacts the reinforcing plate, the reinforcing plate does not move back and forth in the guide body, and the forward and backward movement of the plunger can be transmitted reliably to the guide at the location of the plunger-receiving portion 10B. Referring to FIG. 5, although the extent to which the reinforcing plate protrudes from the slot is not critical, it is desirable that the ratio (h/w), of the height h of the protruded portion to the width of the slot 107, be less than 1. In an example of a preferred embodiment, the reinforcing plate 108 has a width w of 3 mm, and a height h of 0.5 mm. Thus, in this case, the ratio h/w is 0.17.

The shape of the plunger-receiving portion is not especially limited. However, to prevent dislodging of the front end of the plunger from the plunger-receiving portion 101B by transverse vibration of the lever, it is desirable to form protruded portions 104A at the edges of the flange 104, as shown in FIG. 5, to prevent transverse shifting of the lever.

Although in the embodiment shown in FIGS. 1–5, the reinforcing plate 108 protrudes from the slot opening only at the plunger-receiving portion 101B, the plate may protrude from the slot opening along the entire length of the guide.

Figure 3:
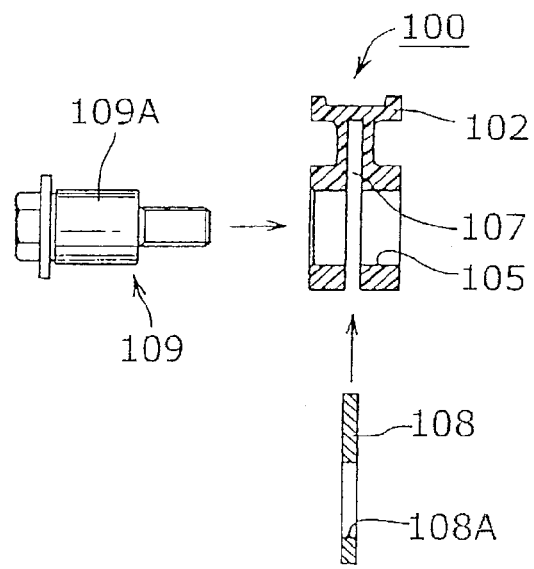
FIG. 3 is an exploded cross-sectional view taken on surface III—III in FIG. 1.
Figure 4:
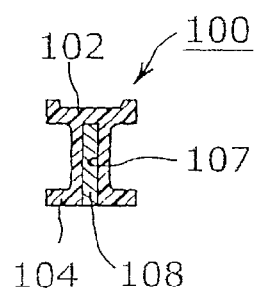
FIG. 4 is a cross-sectional view taken on plane IV—IV in FIG. 1.

A plastic movable guide with a reinforcing plate 108 fitted into it is attached to the frame of an engine or other machine by a shoulder bolt 109, having a pivot portion 109A as shown in FIG. 3, or a mounting pin provided on the frame in such a manner that the mounting bolt or pin penetrated through the guide body 101 and the reinforcing plate 108.

Even if the guide body 101 and the reinforcing plate 108 have different coefficients of thermal expansion, they are secured together only at the location of their mounting holes, which are near one end of the guide. The reinforcing plate and the guide body are otherwise relatively movable in the longitudinal direction, and accordingly, no deformation of the guide body or breakage of its plate-receiving portion occur due to thermal expansion or contraction.

Figure 6:
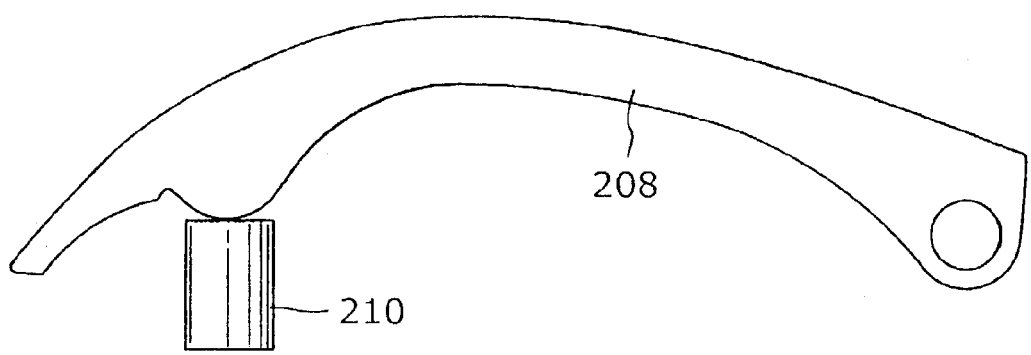
FIG. 6 is a side elevational view showing a reinforcing plate in accordance with a second embodiment of the invention in contact with the plunger of a tensioner.
Figure 7:
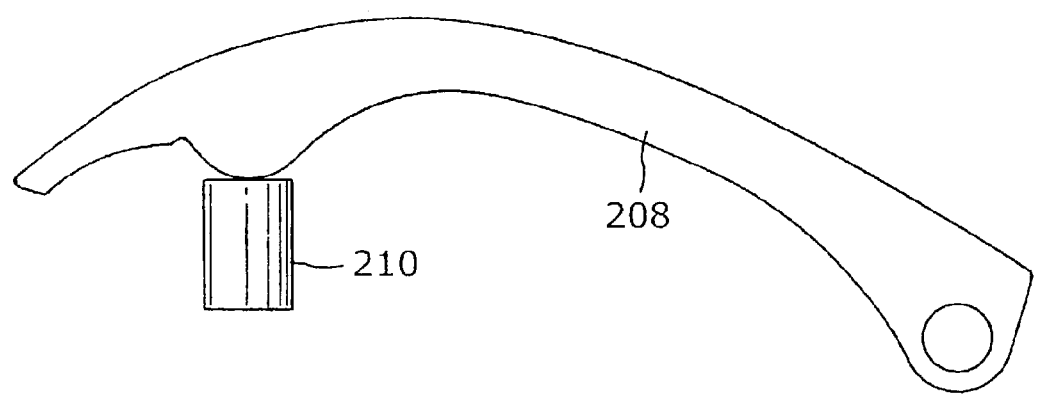
FIG. 7 is a side elevational view of the reinforcing plate shown in FIG. 6 showing the reinforcing plate and plunger engaged with each other at a different contact angle.
Figure 8A:
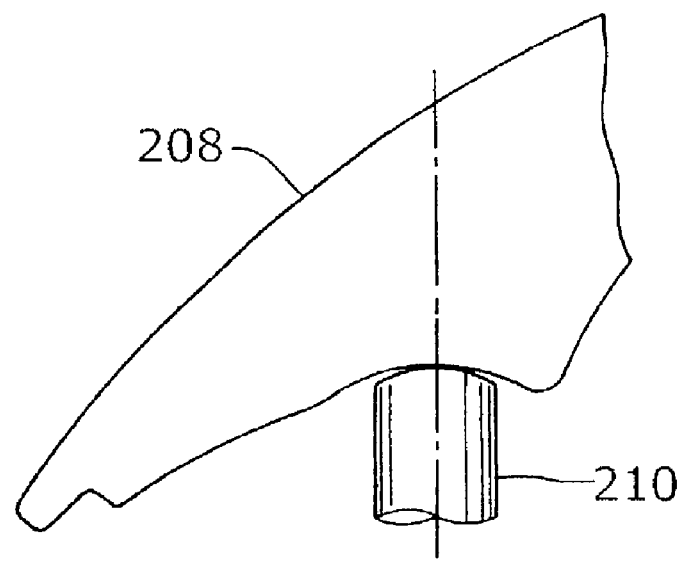
FIG. 8(*a*) is a side elevational view showing another embodiment of the reinforcing plate in contact with a plunger.
Figure 8B:
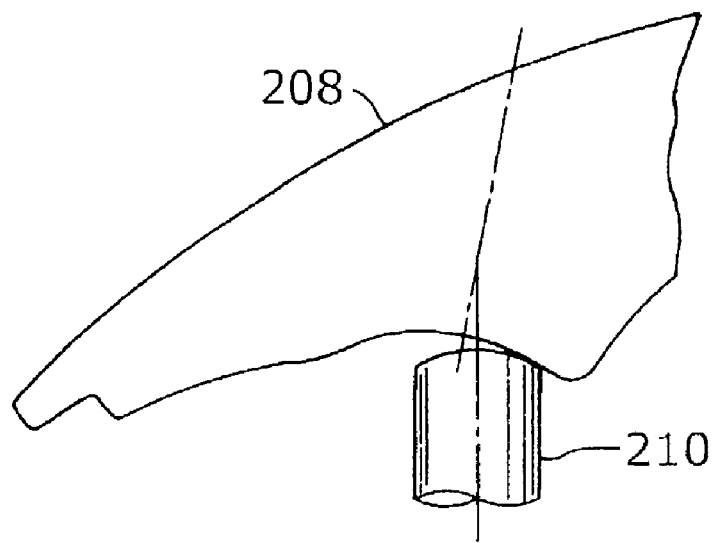

In another embodiment of the invention illustrated in FIGS. 6 and 7, a reinforcing plate 208, which is fitted into a plastic guide body (not shown), has a protruding portion the profile of which is in the form of a convex, circular arc. The protruding portion is brought into contact with the front end of the plunger 210 of a tensioner (not shown). FIG. 6 shows the normal contact between the reinforcing plate 208 and the plunger 210, and FIG. 7 shows the contact between the reinforcing plate 208 and the plunger 210 when plunger has extended from the tensioner as a result of elongation of the chain in which tension is maintained. When the plunger extends, the contact angle between the reinforcing plate and the plunger changes, but, as is apparent from FIGS. 6 and 7, by making the profile of the plunger-contacting part of the reinforcing plate 208 in the form of a convex circular arc, a fixed contact area is always maintained, and, even if the contact angle between the reinforcing plate and the plunger changes, no concentration of load occurs. As a result, wear of the reinforcing plate is suppressed. Although in the embodiment illustrated in FIGS. 6 and 7, the profile of the plunger-contacting part of the reinforcing plate is a convex arc, the same effect can be achieved when the profile is a concave, circular arc, provided that the end of the plunger has a convex shape. As shown in FIGS. 8(a) and 8(b), the front end of the plunger 210 has a convex, spherical shape, while the profile of the plunger-contacting part of the reinforcing plate 208 is a concave circular arc, having a greater radius of curvature than that of the spherical end of the plunger.

Figure 9A:
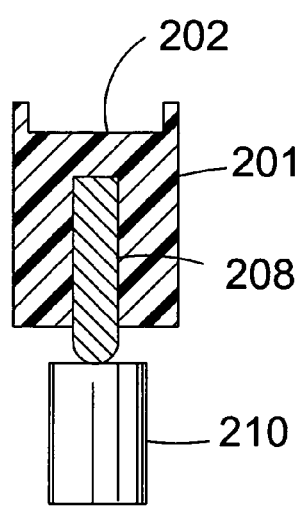
FIGS. 9(a), 9(c) and 9(e) are transverse cross-sectional views, each showing a different embodiment of the plunger-receiving portion of a guide in accordance with the invention, in contact with a plunger of a tensioner.
Figure 9C:
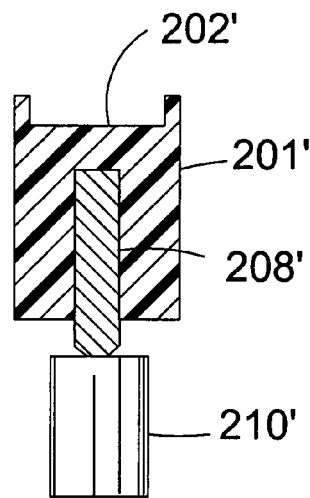
Figure 9E:
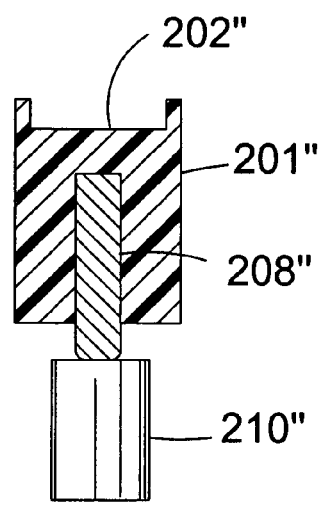
Figure 9B:
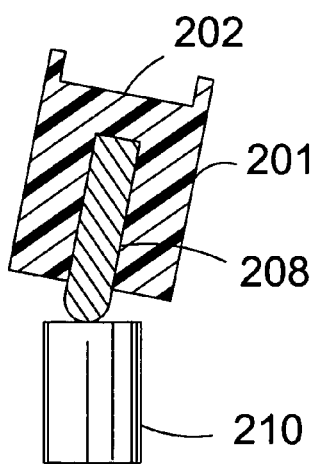
FIGS. 9(b), 9(d) and 9(f) show the guides of FIGS. 9(a), 9(c) and 9(e), respectively in a tilted relationship with the plunger.
Figure 9D:
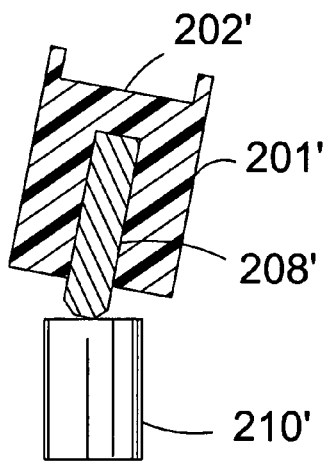
Figure 9F:
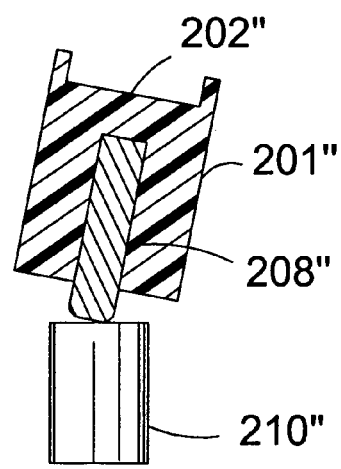
Figure 10:
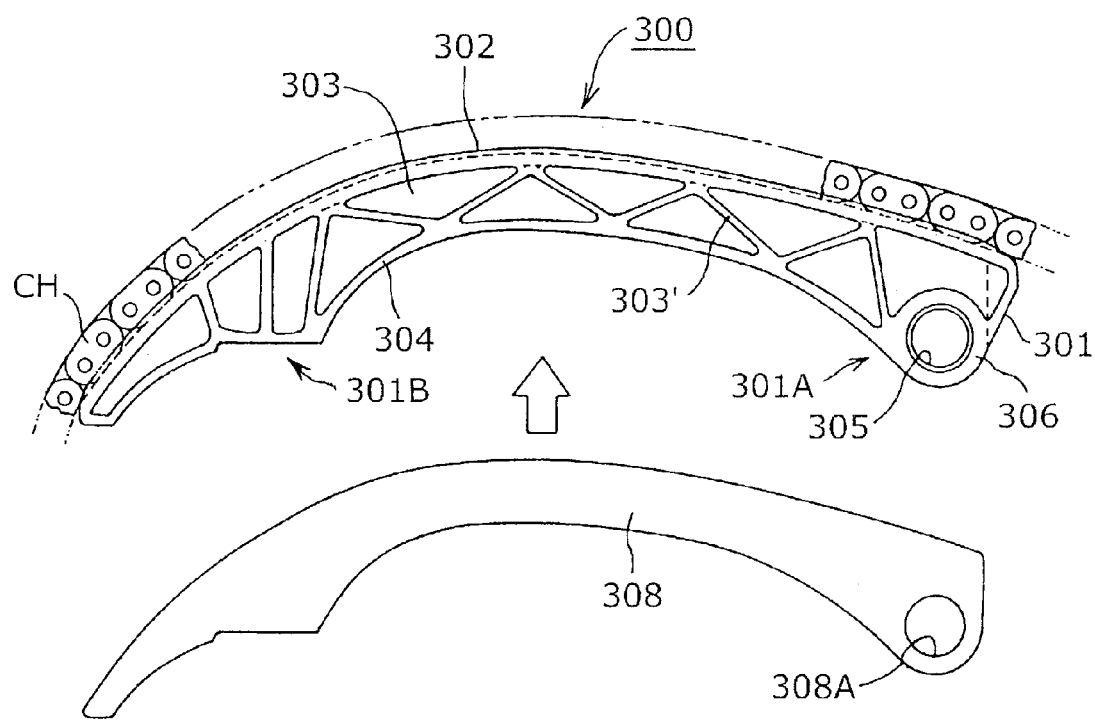
FIG. 10 is an exploded elevational view of a conventional movable guide.
Figure 11:
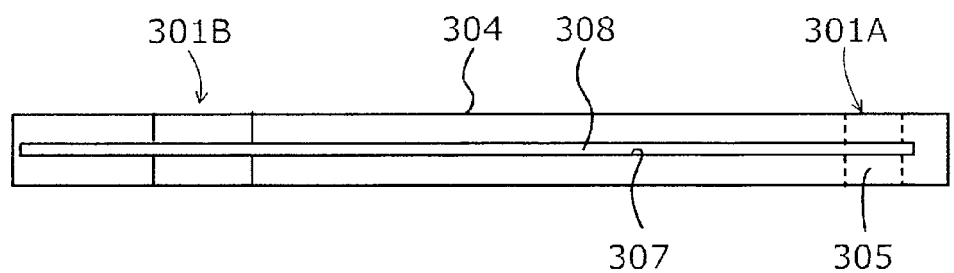
FIG. 11 is a bottom plan view of the conventional movable guide of FIG. 10.
Figure 12A:
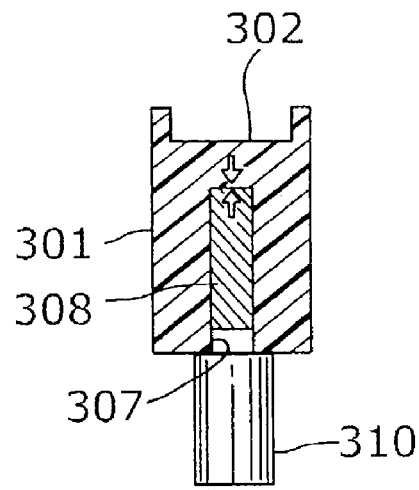
FIGS. 12(a) and 12(b) are transverse cross-sectional views of the plunger-receiving portion of the conventional movable guide, illustrating a problem encountered in the operation of the conventional guide.
Figure 12B:
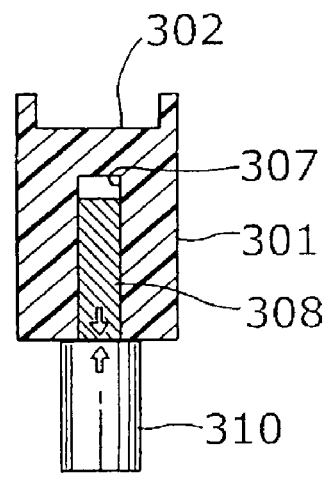
Figure 13A:
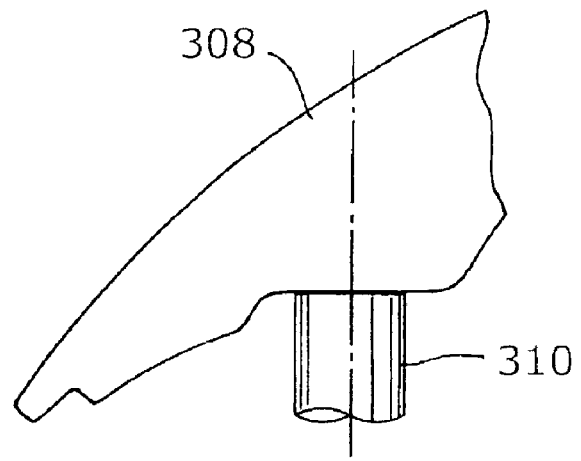
FIGS. 13(a) and 13(b) are side elevational views of the plunger-engaging portion of a reinforcing plate, illustrating another problem of the conventional movable guide.
Figure 13B:
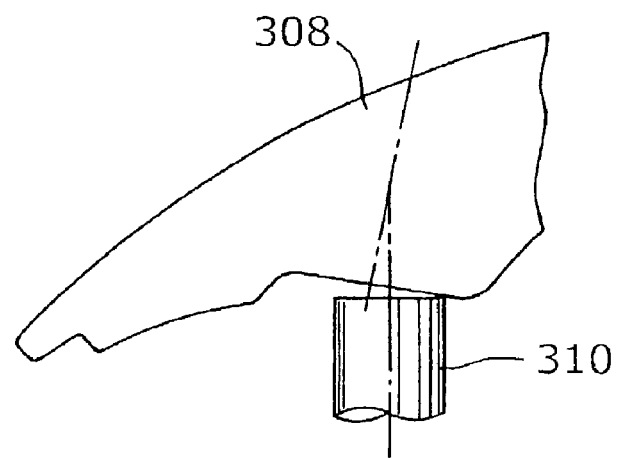
Figure 14A:
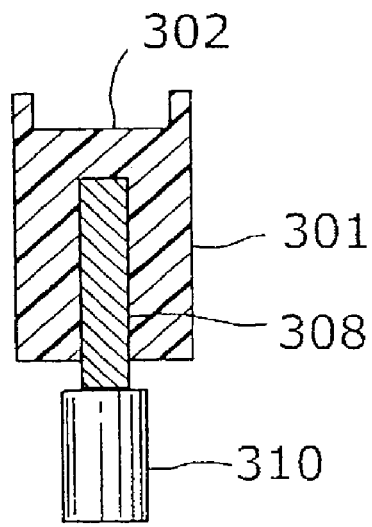
FIGS. 14(a) and 14(b) are transverse cross-sectional views of the plunger-receiving portion of a movable guide, illustrating another problem, which is overcome by the embodiment illustrated in FIGS. 9(a) and 9(b)
Figure 14B:
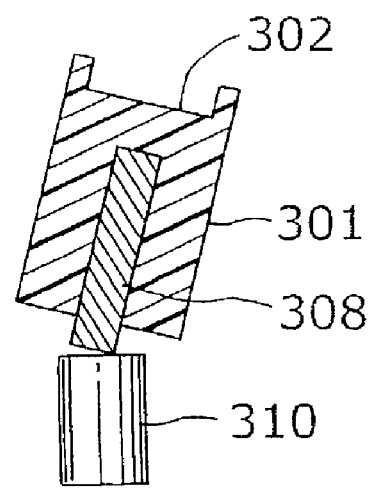
Figure 15:
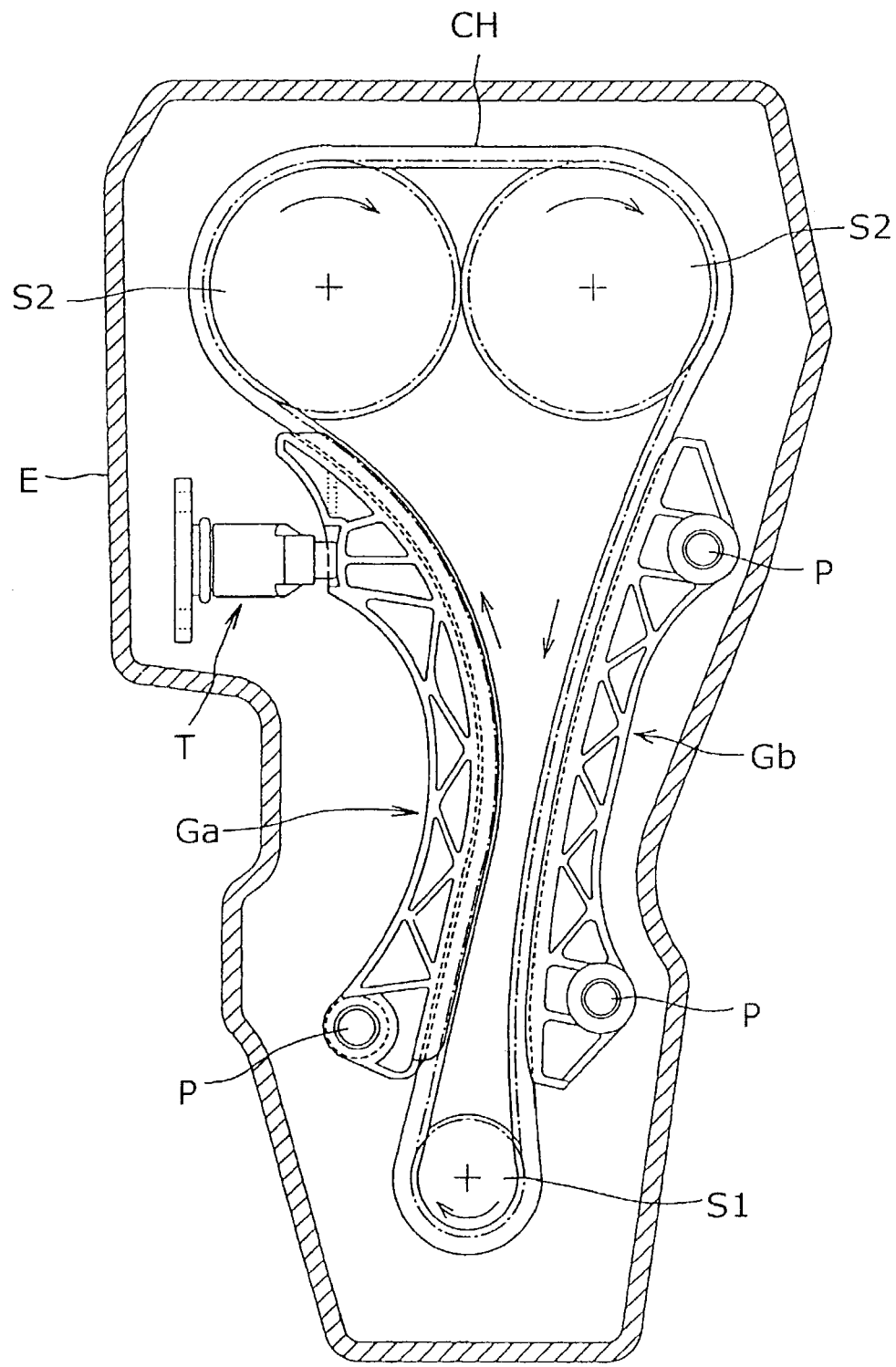
FIG. 15 is an schematic view showing the timing transmission of an internal combustion engine, illustrating how a movable guide is used to guide a timing chain.

In the embodiment illustrated in FIGS. 9(a) and 9(b), the reinforcing plate 208 protrudes slightly from a slot in a guide body 201 having a chain-contacting sliding surface 202. The plunger-contacting edge of the reinforcing plate 208, which contacts the end of plunger 210, is in the form of a substantially circular arc in transverse cross-section. Even if the guide and the plunger 210 are laterally relative to each other in the lateral direction, as depicted in FIG. 9(b), the front end of the plunger does not contact a corner of the plate. Instead, it contacts the rounded edge, and a fixed contact area is maintained. In alternative embodiments illustrated in FIGS. 9(c)–9(f), wherein parts corresponding to the parts in FIGS. 9(a) and 9(b) are identified by the reference numbers of FIGS. 9(a) and 9(b) with prime symbols (' and "), the plunger-contacting edge of the reinforcing plate can have beveled corners, as in plate 208', or rounded corners, as in plate 208".

The benefits afforded by the invention maybe summarized as follows. First, since the reinforcing plate protrudes slightly from the slot opening, the plate reliably remains in contact with the end of the plunger as the plunger moves back and forth. The reinforcing plate does not move relative to the guide body into and out of the slot, and accordingly metallic noise is suppressed, and the overall noise of the engine is reduced. Second, since the reinforcing plate does not move into and out of the slot, it does not hit the bottom of the slot, i.e. the back surface of the shoe, cracking and wear of the shoe are significantly reduced, and the service life of the guide is increased. Third, since the guide body and reinforcing plate are mounted on a bolt or mounting pin extending through holes adjacent one end of the guide, even if they have different coefficients of thermal expansion, they are free to expand and contract longitudinally relative to each other, and accordingly thermal deformation of the guide and breakage of the plate-receiving portion are avoided.

Since the profile of the reinforcing plate is formed so that it contacts the end surface of the plunger over a fixed contact area irrespective of the contact angle between the plunger-receiving portion and the plunger, if the contact angle changes as the chain or other transmission medium elongates, the fixed contact area is maintained, concentration of contact pressure is avoided, and deterioration of the plunger-contacting edge of the reinforcing plate due to wear is reduced.

If the profile of the plunger-engaging portion of the reinforcing plate is a convex or concave circular arc, the contact area between the reinforcing plate and the front end of the plunger can be maintained at a fixed value, but the profile is very simple and can be produced without special working.

If the transverse cross-section of the plunger-contacting edge of the reinforcing plate is a substantially circular arc, or has beveled or rounded corners, even if vibration causes the guide and plunger to be inclined relative to each other, concentration of load at a corner of the edge of the reinforcing plate is avoided, and wear of the reinforcing plate can be suppressed for a long period of time.

I claim:

1. A plastic movable guide for a transmission device comprising:
    a guide body including an elongated shoe having front and back sides facing in opposite directions, a surface on the front side of the shoe for sliding engagement with a traveling, flexible, power transmission medium, and a plate-receiving portion extending longitudinally along the back side of the shoe, the shoe and plate-receiving portion being integrally molded as a unit from a synthetic resin, and the plate-receiving portion having a slot with an opening facing in a direction opposite to the direction in which said front side faces; and
    a unitary, elongated, reinforcing plate for reinforcing said guide body, said plate being fitted into said slot;
    the guide body having a mounting hole adjacent to an end of said plate-receiving portion for mounting the plastic movable guide on a frame of a machine, and the reinforcing plate having a through hole adjacent an end of the reinforcing plate, said mounting hole and said through hole being in register with each other whereby a mounting shaft on which said plastic movable guide is pivoted can extend through both of said holes along a shaft axis, for pivoting the guide body so that it rotates in a plane of rotation to which said shaft axis is perpendicular;
    the guide body having a plunger-receiving portion at a location remote from said holes, said slot extending at least into said plunger-receiving portion of the guide body, and the reinforcing plate protruding from said slot at the location of said plunger receiving portion to expose at least a portion of an edge of said reinforcing plate, whereby a plunger of a tensioner may press directly against said portion of said edge of the reinforcing plate at said location; and
    the cross-sectional shape of said edge of the reinforcing plate in planes perpendicular to said plane of rotation being convex, and free of angles of 90° or less, at the location of said plunger-receiving portion of the guide body, whereby contact between a plunger and a sharp corner of the reinforcing plate is avoided even if the plastic movable guide is tilted relative to its plane of rotation about said mounting shaft.

2. A plastic movable guide for a transmission device according to claim 1, in which the shape of said portion of an edge of the reinforcing plate, in said plane of rotation, is in the form of a convex circular arc.

3. A plastic movable guide for a transmission device according to claim 2, in which said cross-sectional shape of said edge of the reinforcing plate is a shape from the group consisting of a substantially circular arc, a beveled rectangle, and a rectangle having rounded corners.

4. A plastic movable guide for a transmission device according to claim 1, in which the shape of said portion of an edge of the reinforcing plate, in said plane of rotation, is in the form of a concave circular arc.

5. A plastic movable guide for a transmission device according to claim 4, in which said cross-sectional shape of said edge of the reinforcing plate is a shape from the group consisting of a substantially circular arc, a beveled rectangle, and a rectangle having rounded corners.

6. A plastic movable guide for a transmission device according to claim 1, in which said cross-sectional shape of said edge of the reinforcing plate is a shape from the group consisting of a substantially circular arc, a beveled rectangle, and a rectangle having rounded corners.

7. A plastic movable guide for a transmission device according to claim 1, in which said reinforcing plate is composed of a metal.

8. A pivoting tensioner assembly comprising a mounting shaft, a plastic movable guide pivoted on said mounting shaft and having a plunger-engaging surface remote from said mounting shaft, and a tensioner having a plunger with an end surface in engagement with said plunger-engaging surface;
    wherein the plastic movable guide comprises a guide body including an elongated shoe having front and back sides facing in opposite directions, a surface on the front side of the shoe for sliding engagement with a traveling, flexible, power transmission medium, and a plate-receiving portion extending longitudinally along the back side of the shoe, the shoe and plate-receiving portion being integrally molded as a unit from a synthetic resin, and the plate-receiving portion having a slot with an opening facing in a direction opposite to the direction in which said front side faces, and a unitary, elongated, reinforcing plate for reinforcing said guide body, said plate being fitted into said slot;

wherein the guide body has a mounting hole adjacent to an end of said plate-receiving portion, and the reinforcing plate has a through hole adjacent an end of the reinforcing plate, said mounting hole and said through hole being in register with each other;

wherein the mounting shaft extends through both of said holes and the guide is pivoted on a said mounting shaft for rotation in a plane of rotation to which said mounting shaft is perpendicular;

wherein the plunger is restricted to movement in a direction parallel to said plane of rotation;

wherein the guide body has a plunger-receiving portion at a location remote from said holes, said slot extends at least into said plunger-receiving portion of the guide body, and the reinforcing plate protrudes from said slot at the location of said plunger-receiving portion to expose a portion of an edge of said reinforcing plate as a plungerengaging surface, whereby the plunger of the tensioner presses directly against said portion of said edge of the reinforcing plate at said location in a direction parallel to said plane of rotation;

wherein at least one of said end surface of the plunger and said plunger-engaging surface is curved in said plane of rotation, and the shape of said end surface of the plunger and the shape of said plunger-engaging surface are related so that, as the plunger moves along said direction parallel to said plane of rotation while in contact with the plunger, and the guide rotates about said shaft in its plane of rotation, the plunger and the plunger-engaging surface of the reinforcing plate contact each other over a substantially constant area; and wherein the cross-sectional shape of said plunger-engaging surface in planes perpendicular to said plane of rotation is convex, and free of angles of 90° or less, whereby contact between the plunger and the plunger-engaging surface of the reinforcing plate along a sharp corner of the reinforcing plate is avoided even if the plastic movable guide is tilted relative to said plane of rotation.

9. A pivoting tensioner assembly according to claim 8, in which said reinforcing plate is composed of a metal.

* * * * *